April 23, 1935.  H. W. ALDEN  1,999,071
MOTOR VEHICLE
Filed Oct. 7, 1931  4 Sheets-Sheet 1
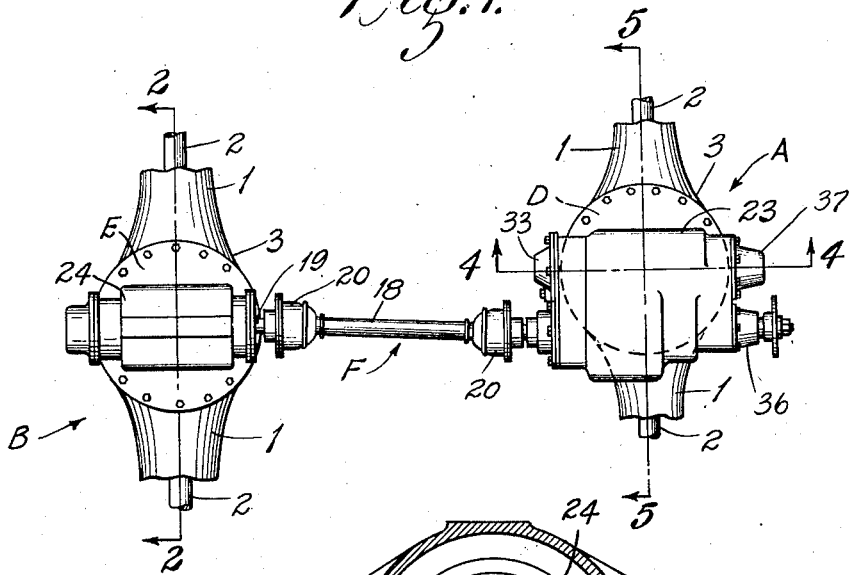
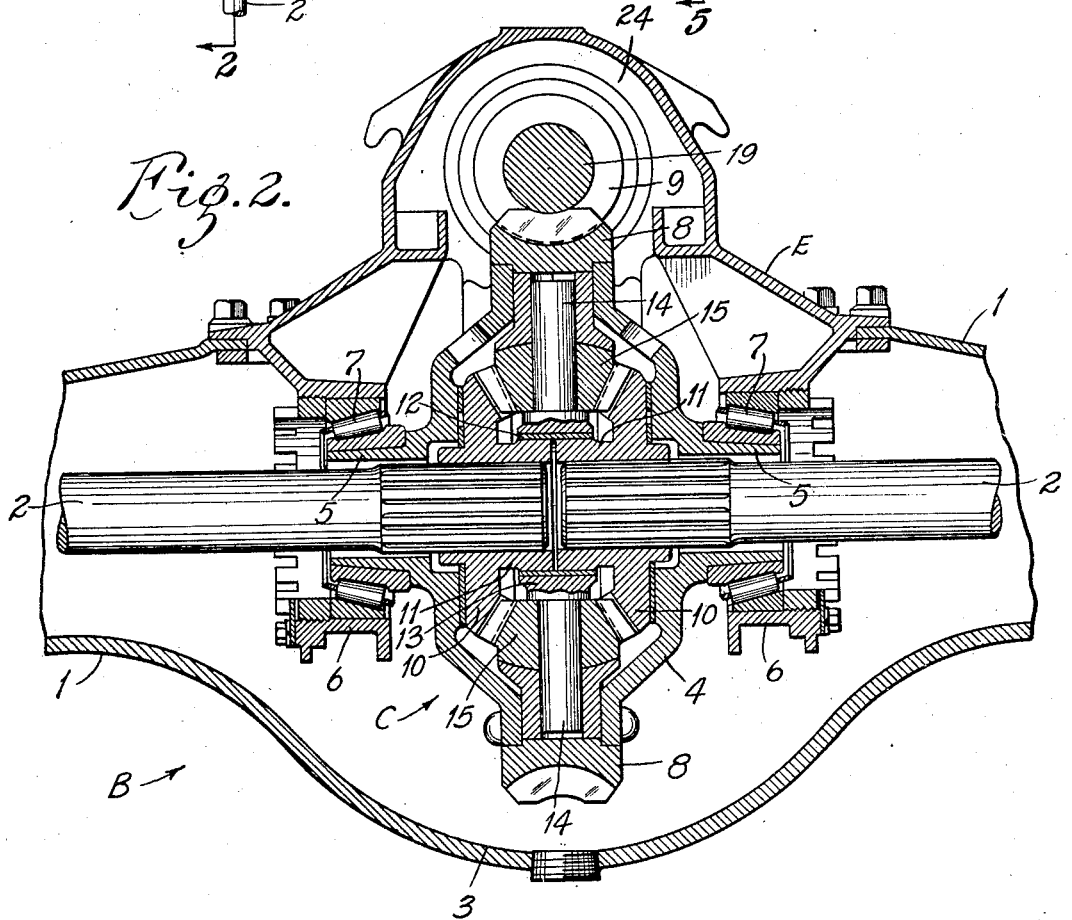
INVENTOR:
Herbert W. Alden
HIS ATTORNEYS April 23, 1935.  H. W. ALDEN  1,999,071
MOTOR VEHICLE
Filed Oct. 7, 1931  4 Sheets-Sheet 2

INVENTOR:
H. W. Alden
HIS ATTORNEYS

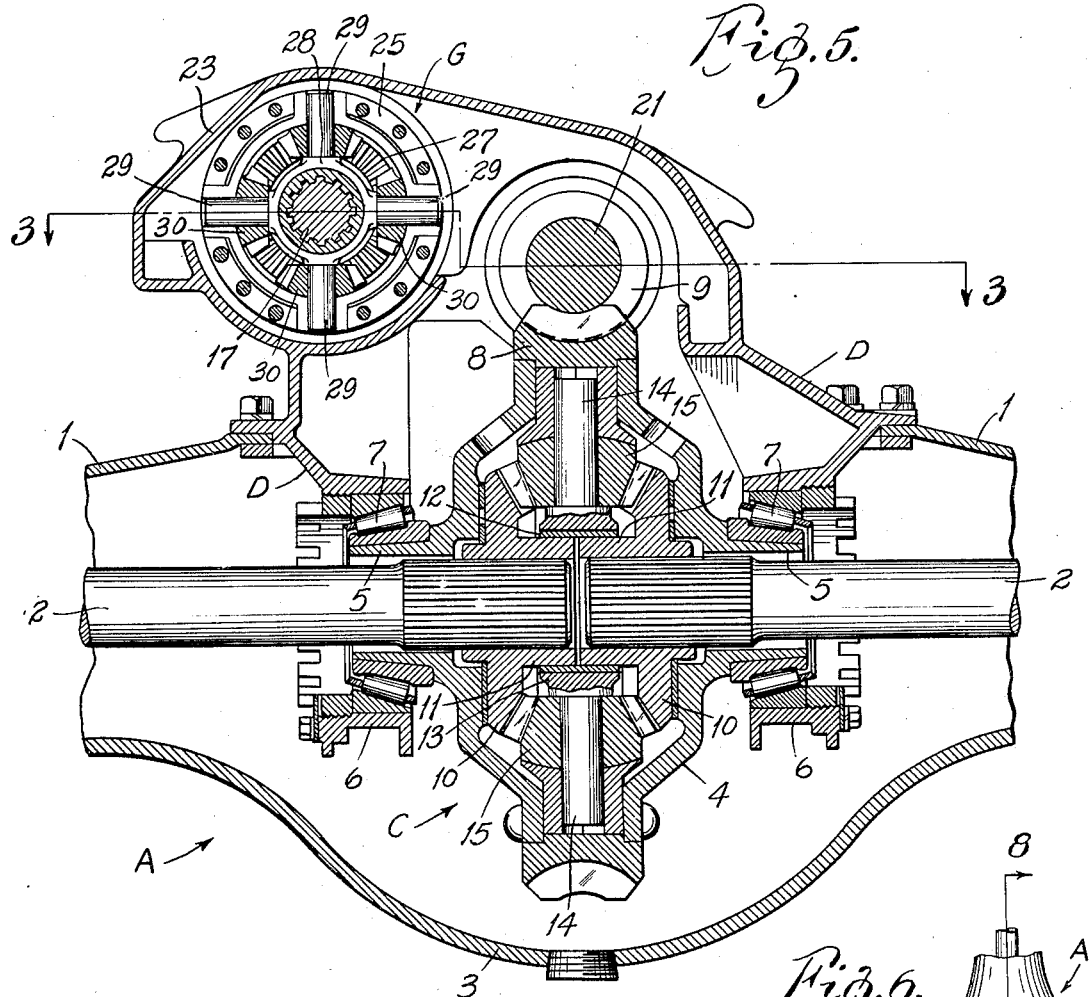
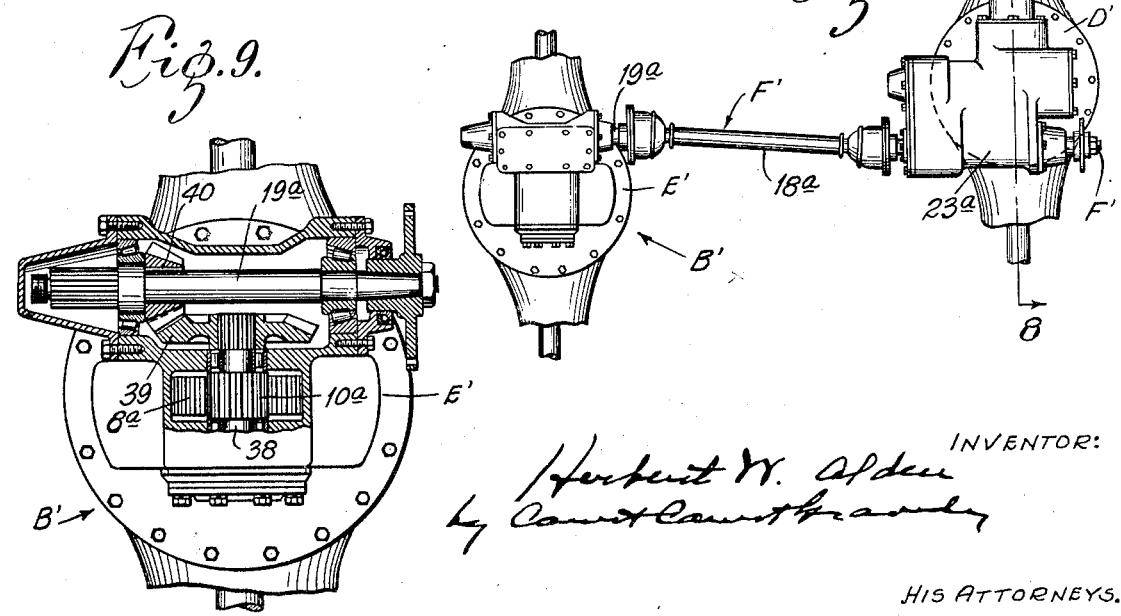

April 23, 1935.  H. W. ALDEN  1,999,071

MOTOR VEHICLE

Filed Oct. 7, 1931  4 Sheets-Sheet 4

INVENTOR:
H. W. Alden
HIS ATTORNEYS.

Patented Apr. 23, 1935

1,999,071

UNITED STATES PATENT OFFICE 1,999,071

MOTOR VEHICLE

Herbert W. Alden, Detroit, Mich., assignor to The Timken-Detroit Axle Company, Detroit, Mich., a corporation of Ohio Application October 7, 1931, Serial No. 567,358

6 Claims. (Cl. 180—22)

This invention relates to motor vehicles of the type having dual driving axle units comprising two differential driving axles that are differentially driven by means of a third differential driving mechanism. One of the principal objects of the present invention is to provide for compactly housing such third differential driving mechanism in the removable gear carrier of one of the differential driving axles in line with the sectional propeller shaft for driving both axles. Another object is to provide a substantially straight propeller shaft for said axles, thereby decreasing the working angle of the universal joints thereof. Other objects are to provide proper bearings for said differential mechanism and the shafting associated therewith, to provide for the ready removal and replacement of said differential and the shafting, and to provide for simplicity and economy of construction and fewness of parts. The invention consists in the construction, combinations and arrangements of parts hereinafter described and claimed.

Figure 3:
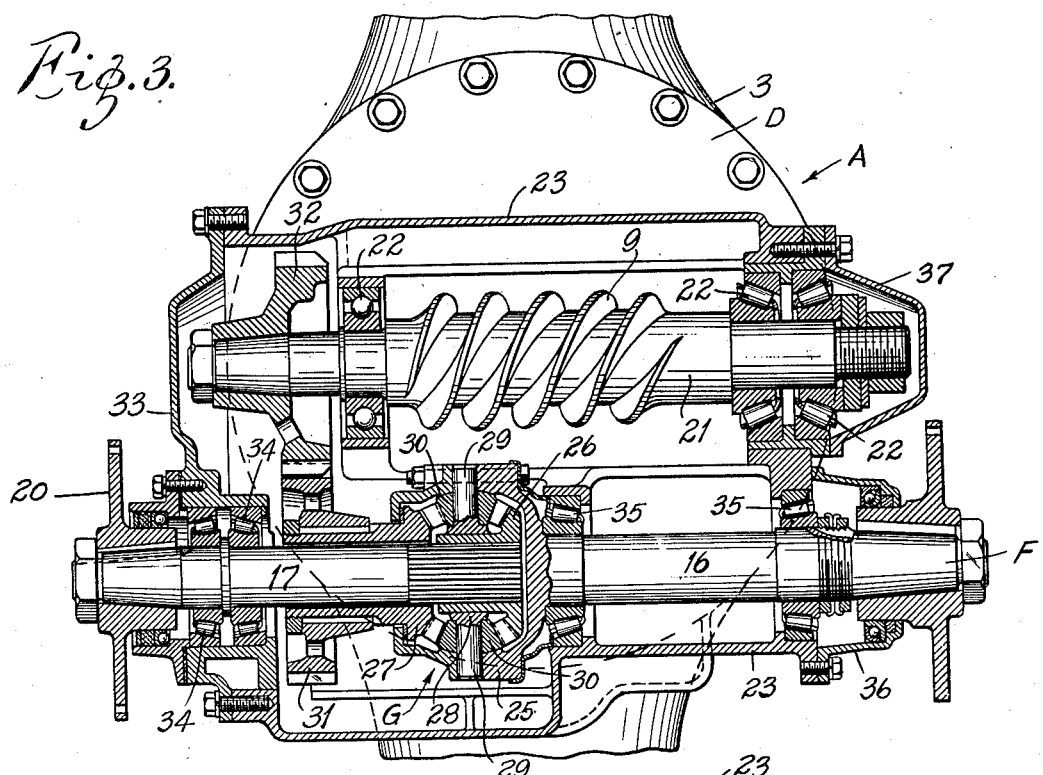
Figure 4:
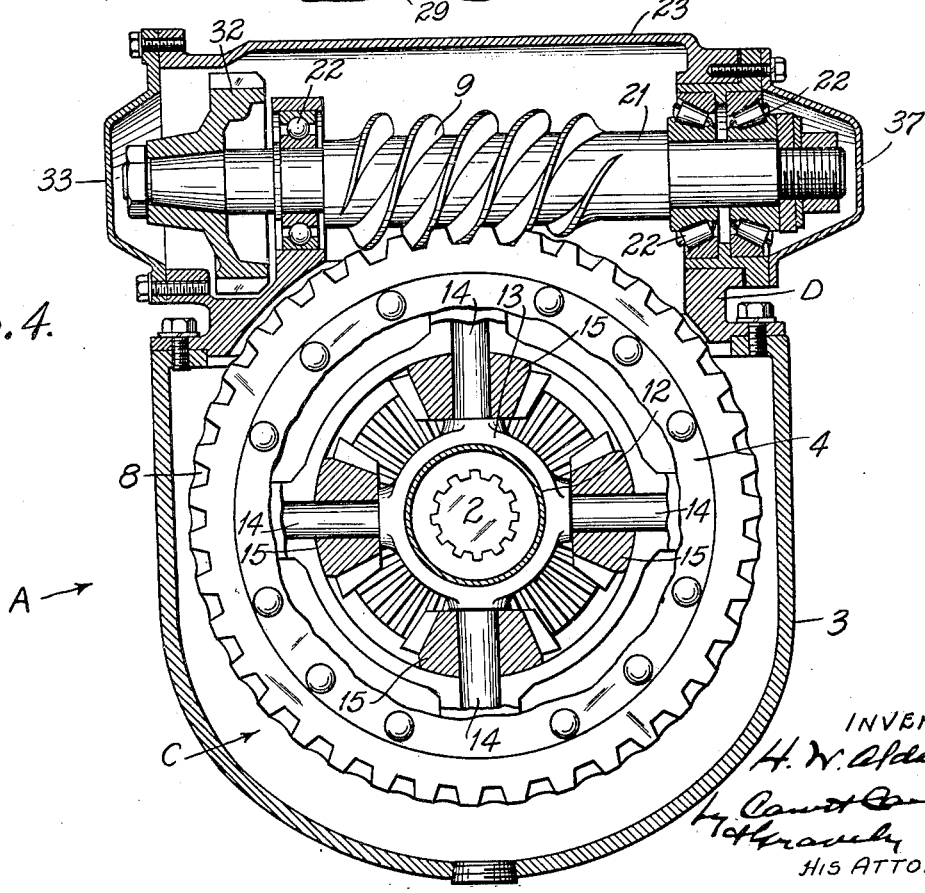
Figure 7:
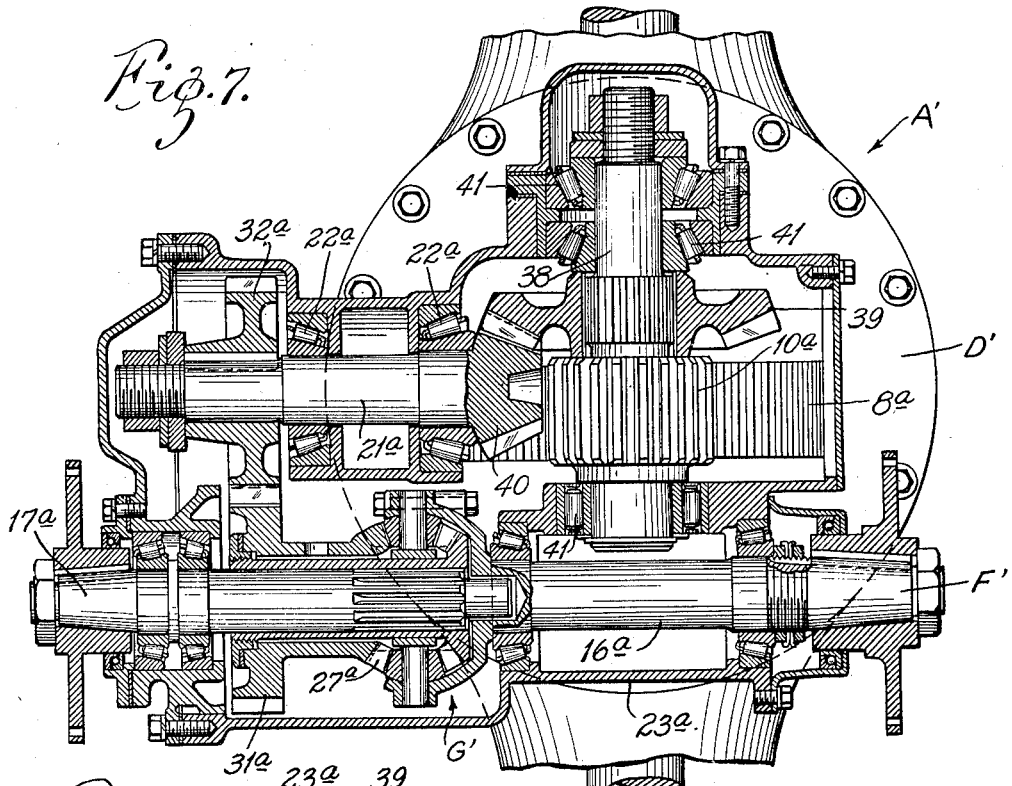
Figure 8:
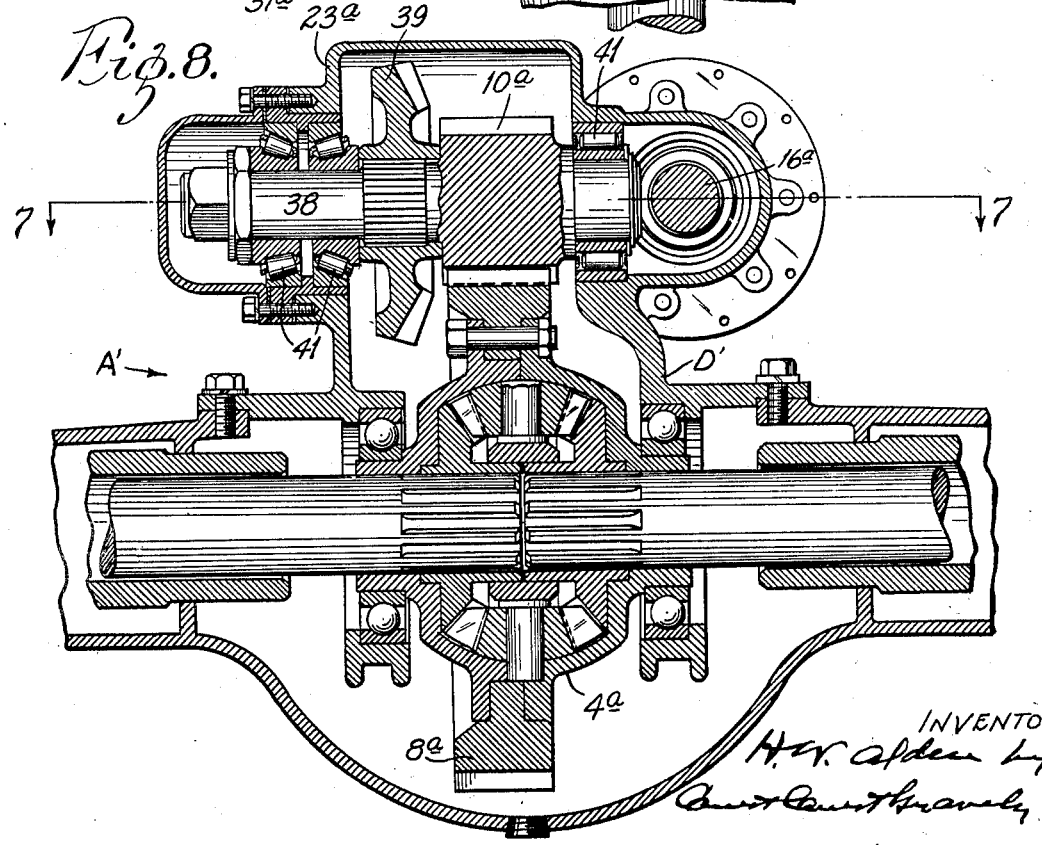

In the accompanying drawings, which form part of this specification and wherein like symbols refer to like parts wherever they occur, Fig. 1 is a plan view of the middle portion of a dual differential driving axle unit embodying my invention, Fig. 2 is a vertical longitudinal section through the middle portion of the rear or final drive axle on the line 2—2 in Fig. 1, Fig. 3 is a horizontal section through the front or through drive axle on the line 3—3 in Fig. 5, Fig. 4 is a vertical transverse section through the front or through drive axle on the line 4—4 in Fig. 1, Fig. 5 is a vertical longitudinal section through said front or through drive axle on the line 5—5 in Fig. 1, Fig. 6 is a plan view similar to Fig. 1, showing a double reduction dual differential driving axle unit, Fig. 7 is a horizontal section through the front or through drive axle on the line 7—7 in Fig. 8, Fig. 8 is a vertical longitudinal section through said front or through drive axle on the line 8—8 in Fig. 6; and Fig. 9 is a fragmentary plan view of the middle portion of the rear or final drive axle, the upper portion of the gear carrier shown in horizontal section.

The dual differential driving axle unit shown in Figs. 1 to 5, inclusive, of the accompanying drawings comprises two worm drive differential driving axles, one forward or through drive axle A and one rear or final drive axle B. Each of said driving axles comprises a load supporting housing having tubular end portions 1 adapted to receive the respective axle shaft sections 2 and an enlarged bowl or pot-shaped middle portion 3, forming a chamber adapted to receive a differential driving mechanism C through an opening provided therefor in the top of said chamber. Gear carriers D and E are removably secured to the tops of the bowl-shaped middle portions 3 of the axle housings of the driving axles A and B, respectively, and enclose and support the differential mechanism C and the driving mechanism associated therewith, the gear carriers closing the openings in the tops of the bowl-shaped portions of said housings.

The differential driving mechanism C for each driving axle is enclosed within a casing 4 provided with axially alined hubs 5 that are adapted to loosely receive the inner ends of the axially alined axle shaft sections 2. The gear carrier for each driving axle has split journal boxes 6 depending therefrom in which are seated suitable antifriction bearings 7 adapted to receive and rotatably support the hubs 5 of the differential casing 4, whereby said differential casing, together with the differential driving mechanism enclosed therein, is removable with said carrier as a unit from the axle housing. Each differential casing 4 is provided with a worm gear 8 that is driven by a worm 9 located thereabove in the carrier for said casing. The differential mechanism enclosed within each differential gear casing 4 of each axle preferably comprises two opposed bevel side gears 10, which are splined on the adjacent inner ends of the axle shaft sections 2 of the axle and have hubs 11 that extend towards each other and are journaled in a bearing 12 provided therefor in a spider 13. This spider has radially extending stub shafts 14 that rotate with the gear casing 4 and rotatably support bevel pinions 15 that intermesh with the side gears 10 on the axle shaft sections 2.

The worms 9 of the two driving axles are differentially driven by means of a sectional main drive or propeller shaft F that extends substantially straight from axle to axle parallel to and substantially in the horizontal plane of said worms. The sectional main drive or propeller shaft F comprises four sections 16, 17, 18 and 19, the forward sections 16 and 17 being mounted on the front or through drive axle A, the rear section 19 being mounted on the rear or final drive axle B, and the propeller shaft section 18 extending from axle to axle having universal joint connections 20 at its opposite ends with the adjacent ends of the sections 17 and 19, respectively. The rear propeller shaft section 19 is mounted in the rear axle gear carrier E substantially midway of the ends of the rear axle housing; and the front axle gear carrier D is offset with respect to the transverse center line of the front axle housing to bring the propeller shaft sections 16 and 17 substantially in line with said rear propeller shaft section. The drive worm 9 for the front axle A is preferably formed integral with a shaft 21 supported in suitable bearings 22 provided therefor in a housing 23 in the top of the gear carrier D for said front axle, said housing also being adapted to receive the forward propeller shaft sections 16 and 17 that are located alongside of the worm shaft 21. The drive worm 9 for the rear axle B is formed integral with the rear propeller shaft section 19, which is journaled in suitable bearings (not shown) in a housing 24 provided therefor on top of the differential gear carrier E of said rear axle.

The forward propeller shaft section 16 is adapted to be connected with the usual change speed transmission gearing (not shown) of the motor vehicle to be driven thereby. The forward section 16 of the propeller shaft F is operatively connected to the section 17 thereof by means of an additional or third differential mechanism G that is enclosed within a split casing 25, one-half of which is formed integral with the rearward end of the propeller shaft section 16, and the other half of which is bolted to said first mentioned half. The differential mechanism G enclosed within the casing 25 comprises two opposed bevel side gears 26 and 27, the side gear 26 having its hub portion splined on the section 17 of the propeller shaft F for rotation therewith and the side gear 27 having its hub portion journaled on said section for rotation relative thereto. The hub of the side gear 26 is rotatably supported in a bearing provided therefor in the hub of a spider 28, which is disposed between the two bevel side gears 26 and 27 and has radially extending stub shafts 29 that are anchored to the gear casing 25 and have bevel pinions 30 journaled thereon that intermesh with and are driven by said bevel side gears. The driving connection between the third differential mechanism G and the worm drive shaft 21 for the forward axle A comprises a spur gear 31, which is fixed to the hub of the bevel side gear 27 of said differential and intermeshes with a spur gear 32 fixed to the forward end of said worm drive shaft. The housing 23 of the gear carrier D for the front driving axle A contains the propeller shaft sections 16 and 17, the third differential mechanism G, the worm drive shaft 21 and the gearing for operatively connecting said differential mechanism and said worm drive shaft; and said housing is provided at its rear end with an opening through which all of these parts may be inserted in and removed from said carrier housing. This opening is closed by means of a cover plate 33 having suitable bearings 34 therein for rotatably supporting the rear end portion of the propeller shaft section 17. The propeller shaft section 16 is rotatably supported adjacent to its opposite ends by suitable bearings 35 seated in the housing 23. The housing 23 is also provided at its front end with openings adapted to accommodate the propeller shaft section 16 and the worm drive shaft 21 and the bearings therefor, which openings are closed by closure members 36 and 37, respectively.

Figs. 6 to 9, inclusive, illustrate a double reduction dual driving axle unit wherein the differential gear case 4a of each axle is provided with a spur gear ring 8a that is driven by a spur pinion 10a on a shaft 38 having a bevel gear 39 thereon that is driven by a bevel pinion 40. The removable gear carrier D' of the forward differential driving axle A' is provided with a housing 23a within which is mounted the double reduction gearing just described, the two forward sections 16a and 17a of the sectional propeller shaft F' and the additional or third differential mechanism G' for driving said sections. The construction and mounting of the two propeller shaft sections 16a and 17a and the differential mechanism G' for driving them are substantially the same as the construction and mounting of the propeller shaft sections 16 and 17 and differential mechanism G mounted in the single reduction front driving axle A hereinbefore described. As shown in Figs. 7 and 8, the two propeller shaft sections 16a and 17a and the driving mechanism therefor are located in the housing 23a of the front axle gear carrier D' alongside and substantially in the horizontal plane of a horizontal drive shaft 21a which has the bevel pinion 40 thereon and is journaled in suitable bearings 22a provided therefor in said housing. This drive shaft 21a is driven from the side gear 27a of the differential G' by means of a spur gear 31a which is fixed to the hub of said side gear and drives with a spur gear 32a fixed to the forward end of said drive shaft. The shaft 38 having the bevel gear 39 and spur pinion 10a thereon is rotatably supported near each end in suitable bearings 41 seated in the housing 23a of the gear carrier D'. The rear section 19a of the sectional propeller shaft F'' is mounted in the gear carrier E' of the rear axle B' and has the bevel pinion 40 of the double reduction gearing of said axle fixed thereon. As shown in Fig. 6, the gear carriers of the two double reduction axles are offset with respect to the transverse center lines thereof in order to bring the sections of the propeller shaft F' in substantial alinement.

By the arrangements described, the power delivered from the engine to the forward section of the sectional propeller shaft is transmitted to the third differential mechanism in the gear carrier of the forward axle, which mechanism serves to differentially drive the differential mechanisms of the two axles, thereby equalizing the driving, starting, stopping and braking torque on said axles and permitting the brakes on the wheels thereof to be adjusted independently of each other. In the construction shown in Figs. 1 to 5, inclusive, the drive from the third differential is through the intermeshing spur gears 31 and 32 to the worm shaft 21 to the forward axle differential and through the propeller shaft sections 17, 18 and 19 to the rear axle differential. In the double reduction driving axle unit shown in Figs. 6 to 8, inclusive, the drive from the third differential is through the intermeshing spur gears 31a and 32a to the shaft 21a and thence through the double reduction gearing to the forward axle differential, and through the propeller shaft sections 17a, 18a and 19a and thence through the double reduction gearing of the rear axle to the differential thereof.

It is noted as an important advantage of my invention that it provides a substantially straight through drive between the two axles for differentially driving them, thereby decreasing the working angle of the universal joints of the sectional propeller shaft. It also locates the propeller shaft in the horizontal plane of the main drive gear for each axle differential, thereby providing a maximum vertical clearance between the driving axles and the chassis of the vehicle. It is also noted that in both constructions the third differential and the shafting associated therewith are compactly housed within the gear carrier and are either removable therewith as a unit or separately therefrom.

Obviously, the hereinbefore described arrangements admit of considerable modification without departing from the invention. Therefore, I do not wish to be limited to the precise construction shown and described.

What I claim is:

1. In an axle assembly, an axle housing, a pair of alined, horizontally disposed axles mounted for rotation in said axle housing and having a differential mechanism operably associated therewith; a worm gear concentrically disposed with respect to said axles and adapted to apply rotative efforts to said differential mechanism, a worm shaft mounted for rotation in said housing and disposed transversely with respect to said axles, a worm mounted on said worm shaft and meshing with said worm gear, a driving propeller shaft and a driven propeller shaft disposed in axial alinement and mounted for rotation in said housing, said driving and driven propeller shafts extending outwardly of said housing through apertures located in opposite sides thereof and adapted to have power applied thereto and taken therefrom respectively, the axis of said worm shaft being spaced from the axes of said driving and driven propeller shafts, and means for transmitting power from said driving propeller shaft to said driven propeller shaft and to said worm shaft, said propeller shafts and said means being substantially entirely included between a pair of parallel vertical planes which are parallel to said axles and which are tangentially disposed with respect to the outer periphery of said worm gear.

2. The axle construction described in claim 1, wherein said driving and driven propeller shafts are disposed parallel to said worm shaft.

3. The axle construction set forth in claim 1, wherein said last named means comprises a differential mechanism operably coupled to said driving and driven propeller shafts and to said worm shaft.

4. The axle construction, set forth in claim 1, wherein said worm shaft is disposed in side-by-side relation to said propeller shafts and lie in substantially the same horizontal plane.

5. In an axle construction, an axle housing, a pair of axially alined and horizontally disposed axles mounted for rotation in said housing, means, including a ring-like gear for imparting rotational efforts to said axles, a pair of axially alined propeller shafts rotatably mounted in said housing, said propeller shafts extending through apertures located in opposite sides of said housing and adapted to have power transmitted thereto and taken therefrom, and means, comprising a differential mechanism, for transmitting power from one of said propeller shafts to said other propeller shaft and to said gear, said propeller shafts and said differential mechanism being substantially entirely included between a pair of parallel vertical planes which are parallel to said axles and which are tangentially disposed with respect to the outer periphery of said ring-like gear, whereby rotative tendencies of said housing in response to vertical impulses imparted thereto by road shocks are reduced to a minimum.

6. In an axle construction, an axle housing, a pair of aligned, horizontally disposed axles mounted for rotation in said axle housing, means, including a worm gear, for driving said axles, said worm gear being concentrically disposed with respect to said axles, an auxiliary housing secured to said axle housing and having an opening therein through which said worm gear projects, the meeting faces of said axle housing and said auxiliary housing being disposed in a substantially horizontal plane, a substantially horizontally disposed worm gear shaft mounted for rotation in said auxiliary housing and having a worm thereon meshing with said worm gear, a pair of aligned propeller shafts mounted for rotation in said auxiliary housing and disposed substantially parallel to said worm gear shaft and disposed in a plane which is closely adjacent a horizontal plane containing said worm gear shaft, said propeller shafts respectively extending through apertures in opposite sides of said auxiliary housing, and means for transmitting power from one of said propeller shafts to said other propeller shaft and to said worm shaft, comprising a differential mechanism operably connected to one of said propeller shafts and so disposed in said auxiliary housing as to be intersected by a plane containing said axles and at least a portion of said worm.

HERBERT W. ALDEN.